United States Patent [19]

Mount, II

[11] Patent Number: 4,685,294

[45] Date of Patent: Aug. 11, 1987

[54] VISCOSITY-TEMPERATURE COMPENSATOR FOR HYDRAULIC SYSTEMS

[75] Inventor: Houston B. Mount, II, Tulsa, Okla.

[73] Assignee: Amoco Corporation, Chicago, Ill.

[21] Appl. No.: 724,849

[22] Filed: Apr. 18, 1985

Related U.S. Application Data

[63] Continuation of Ser. No. 452,577, Dec. 23, 1982, abandoned.

[51] Int. Cl.[4] ........................ E21B 49/06; F16D 31/00

[52] U.S. Cl. ........................................ 60/329; 60/426; 60/484; 408/12; 408/17; 408/130

[58] Field of Search .................. 91/419, 61, 517, 518; 60/329, 420, 422, 426, 494, 484; 408/11-13, 10, 17, 130; 175/38

[56] References Cited

U.S. PATENT DOCUMENTS

| | | | |
|---|---|---|---|
| 2,005,731 | 6/1935 | Ernst et al. | 60/329 |
| 3,910,044 | 10/1975 | Symmank | 60/420 |
| 4,280,569 | 7/1981 | Mount, II | 175/26 |

FOREIGN PATENT DOCUMENTS

| | | | |
|---|---|---|---|
| 0917957 | 4/1982 | U.S.S.R. | 408/130 |

*Primary Examiner*—Edward K. Look

*Attorney, Agent, or Firm*—Fred E. Hook; Timothy H. Briggs

[57] ABSTRACT

A hydraulic control system for a downhole sidewall coring tool having first and second power hydraulic systems in which changes in pressure drop in a portion of the first hydraulic system adjusts a control valve to change the pressure in a part of the second hydraulic system. Means are provided to adjust the operation of the control valve as a function of viscosity change in the hydraulic fluid caused by change in ambient temperature.

6 Claims, 2 Drawing Figures

VISCOSITY-TEMPERATURE COMPENSATOR FOR HYDRAULIC SYSTEMS

This is a continuation of copending application Ser. No. 452,577 filed on Dec. 23, 1982, now abandoned.

BACKGROUND OF THE INVENTION

This invention relates to a hydraulic control system for a sidewall coring tool. In determining the physical properties of subterranean formations, it is of great assistance to have what is commonly called cores. A core is typically a cylindrical piece of rock which has been cut from an underground formation and can vary in size and length. A typical size is ½ in. diameter and 4 to 6 in. long, although samples can be of larger diameter and of greater length depending upon the facilities available. One type of core cutter is a type that can be used to cut the cores from the sidewall of a borehole after the borehole has already been drilled. Such a sidewall coring tool is described in U.S. Pat. No. 4,280,569, entitled "Fluid Flow Restrictor Valve for a Drill Hole Coring Tool", issued July 28, 1981, to Houston B. Mount, II., inventor. In that invention, a core barrel having a core bit on the end thereof, is pushed against the formation at the same time the core barrel is being rotated so that as the core is cut it enters into the core barrel. A high volume hydraulic system is used to rotate a hydraulic motor which, in turn, rotates the core cutting bit. A low volume hydraulic system is used to force the drill bit against the formation. Control means are provided so that if the torque on the hydraulic motor, used to rotate the bit, increases, the pressure of the fluid which is used to force the bit against the wall is reduced. On the other hand, if the torque decreases on the hydraulic drive motor for the bit, the pressure of the hydraulic fluid on the means forcing the core bit against the formation increases. Thus, the control system is designed to prevent the hydraulic motor from being over torqued by being advanced too rapidly into the formation. A problem that has arisen in the operation of this type of system is that torque compensating adjustments of the automatic drilling hydraulic circuit are very sensitive to changes in ambient temperatures in the wellbore. The present invention overcomes this problem.

BRIEF DESCRIPTION OF THE INVENTION

This invention relates to a downhole apparatus for cutting sidewall cores in which that apparatus has a high volume hydraulic fluid system and a low volume hydraulic fluid system. The high volume system is used to drive a hydraulic motor which rotates the coring bit. The low volume hydraulic system is used to advance or retract the core bit from the borehole wall. There is an automatic drilling control valve which functions by sensing the hydraulic pressure drop across the motor which rotates the coring bit. This sensed pressure drop is used in a control valve to regulate the flow of hydraulic fluid to the cylinder which advances the bit into the rock formation as the sample is cut. In the prior systems, the automatic drilling circuit has been very sensitive to changes in ambient temperatures in the wellbore so that good control is not always obtained. The pressure drop across the hydraulic bit motor is measured remotely through several feet of small tubing and hoses. As the temperature of the hydraulic fluid varies, its viscosity varies. As the pressure drop across the tubing is proportional to viscosity for a given flow rate, this variation in viscosity results in incorrect control. I have devised a method which automatically compensates for this pressure change with no moving parts and a minimum of complexity. The fluid in the backside of the sensing piston of the control valve is referenced to the pressure drop across a compensator which is preferrably a long fine tubing. Previously, it was simply referenced to the reservoir pressure. This tubing is chosen to have a length and diameter such that the pressure drop developed across it is equal to the pressure drop across the high volume tubing that feeds the bit motor. This drop will also be proportional to viscosity and sensitive to ambient temperature. By referencing the sensing system to this pressure drop, the error introduced by the motor feed tubes is effectively balanced out, no matter what the temperature and viscosity of the hydraulic fluid may be.

A better understanding of the invention may be had from the following description taken in conjunction with the drawings.

DETAILED DESCRIPTION

Figure 1:
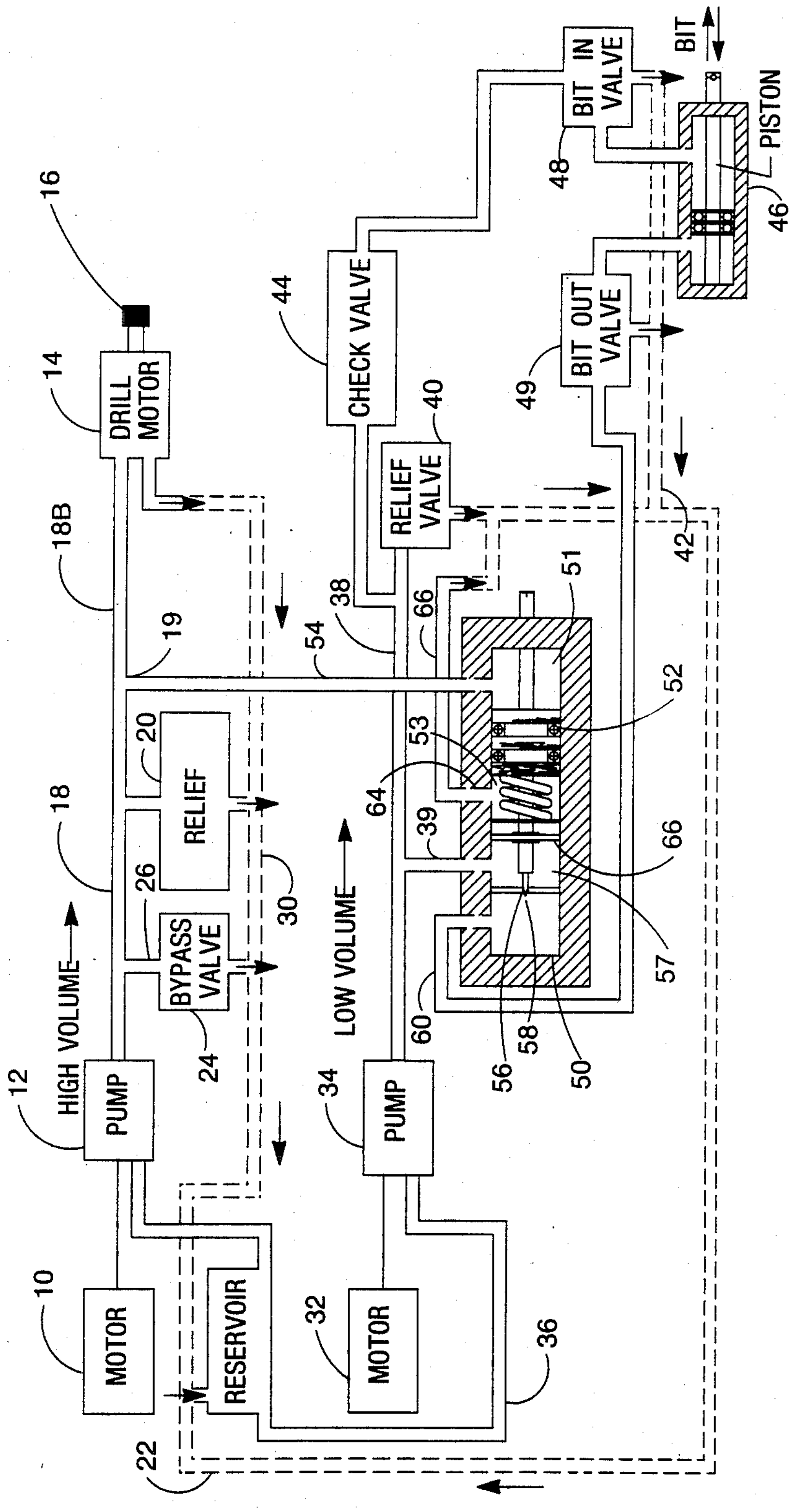
FIG. 1 PRIOR ART
FIG. 1 is a simplified schematic of the automatic control system used prior to my present invention.

Attention is first directed to FIG. 1 which shows a simplified schematic of the automatic control system described in said U.S. Pat. No. 4,280,569 and especially is illustrated in FIGS. 24 and 25. That patent is incorporated herein by reference. Shown in FIG. 1 is a high volume system and a low volume system. The high volume system includes a motor 10, a hydraulic pump 12 which is connected to hydraulic motor 14 having core bit 16 attached thereto. Typically, pump 12 can develop pressures up to 1000 lbs per square in. and a volume of five gallons per minute or more. The hydraulic pump 12 is connected through a conduit 18 and conduit section 18B to motor 14. Line 18 is provided with a relief valve 20 whose discharge is connected back to power fluid reservoir 22. A typical pressure setting for the relief valve is 800 lbs per square in. A bypass valve 24 is connected through flowline 26 to flowline 18. This valve is remotely operated from the surface and can bypass fluid from the drill motor directly to reservoir 22. The bypass valve is activated to allow easy starting of the motor 10 which drives pump 12.

The low volume hydraulic system is used to move the coring bit 16 toward or away from a sidewall of the borehole under controlled conditions. This system includes a motor 32, hydraulic pump 34 whose intake is connected by line 36 to reservoir 22. The output of pump 34 is connected to hydraulic line 38 which is provided with a relief valve 40 which is connected to fluid return line 42 for returning the spent hydraulic fluid to reservoir 22. Line 38 is also connected through a check valve 44 which is connected to a piston means 46 which drives the coring bit in and out in relation to the borehole wall. The output of line 38 is connected to a valve 48, controllable from the surface, which, when open, is connected to the side of piston cylinder 46 which drives the piston back so that the bit is driven in or retracted from the wall. A similar valve 49, when open, permits fluid to drive piston 46 to force the coring bit 16 against the borehole wall.

A control valve 50 is provided to sense the pressure on motor 14 and control the fluid which drives the piston 46 outwardly to drive the bit against the borehole wall. Valve 50 can be identical to the valve shown in FIGS. 26 and 27 of said U.S. Pat. No. 4,280,569 and functions as described in said patent. This modulator valve 50 has a piston 52. One side of the piston 52 is connected through line 54 to hydraulic control line 18 at a point which gives a measure of the pressure on motor 14. The other side of piston 52 within the cylinder valve 50 is connected to low volume line 38. An orifice 56 is provided and a needle-type valve 58 regulates the opening of the orifice 56 in response to the difference in pressure in the high volume line 18 and the low volume line 38 (check). The low volume fluid flows through line 38 and 39 into space 57 of the valve 50 and out through line 60 to the one side of the piston to drive the bit out against the borehole wall. Valve 50 has an exhaust port 64 which is connected through conduit 66 to return conduit 42 for returning fluid to the reservoir 22. Valve base 66 has seating engagement with the housing of valve 50 so that fluid coming in through conduit 39 is not in direct fluid communication with outlet port 64.

The system described above, in regard to FIG. 1, works well for many occasions. However, with changes in ambient temperatures in the wellbore the automatic control does not always function properly. The main source of this problem appears to be that the pressure drop across the motor 14 is measured remotely through several feet of small tubing and hoses. The pressure drop from the intersection 19 of conduit 18 and 54 over conduit section 18B to the output of motor 14 determines the pressure in chamber 51 of valve 50 which pushes the piston 52 to the left against the spring. Typically, the pressure drop across the bit motor is measured remotely through some six or seven feet of 3/8 in. tubing and hoses. The flow rate in these hoses is about five gallons per minute and a considerable pressure drop in pressure can develop over that length. This additional pressure drop can be canceled out by adjustments of the automatic control valve 50 except that as the temperature of the hydraulic fluid varies, viscosity varies and the pressure drop across the various tubings is proportional to viscosity. The pressure drop truly can vary up to 200 psi with the variations in temperature and viscosity in the well operation which is not indicative of the torque of motor 14.

Figure 2:
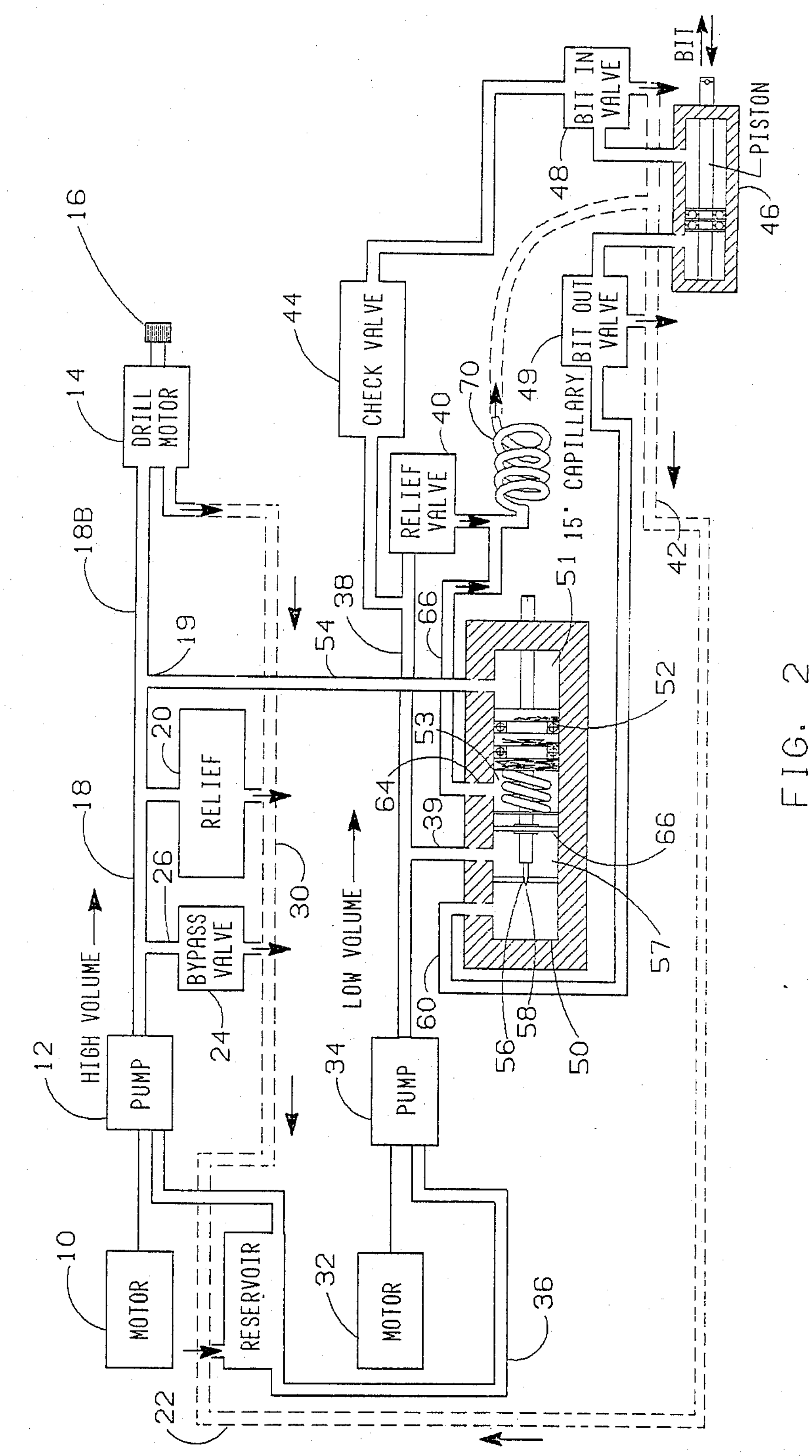
FIG. 2 is a schematic drawing similar to FIG. 1 except that it has added thereto viscosity compensating means for temperature change.

I have devised a method and system which automatically compensates for the pressure change just described above with no moving parts and a minimum of complexity. FIG. 2 is similar to FIG. 1 but shows the changes which have been made to relieve the problems discussed. The outlet from volume 53 or the spring side of piston 52 is connected through conduit 66 to a capillary tubing 70. The length and diameter of capillary tubing 70 is selected such that the pressure drop developed across it is equal to the pressure drop across the conduit 18B connected to motor 14. The temperature of the fluid in section 18B will be approximately the same as the temperature of the fluid in capillary tubing 70. Thus, the drop will also be proportional to the viscosity and sensitive to the ambient temperature. Thus, by referencing the sensing system of control valve 50 to this pressure drop, the error introduced by the motor feed conduits is effectively balanced out. This is true no matter what the temperature and viscosity of the hydraulic fluid may be.

This system has been developed, designed, installed and operated in actual operating conditions. In one system, the length of the tubing 18B was about 10 feet and had an internal diameter of $\frac{3}{8}$ in. with a flow rate of 5 gallons per minute. A compensating capillary tube 70 was devised and had a length of about $1\frac{1}{4}$ feet and an internal diameter of 0.15 in. for a flow of approximately 0.05 gallons per minute which was nearly a constant value. This provided for a drop which is equal to that across the conduit 18B of the high volume system.

While the above invention has been described in detail, various modifications can be made thereto without departing from the spirit or scope of the invention.

What is claimed is:

1. A hydraulic control system for use in a sidewall coring tool to control a hydraulic motor used to drive a bit and a ram means for advancing and retracting the bit from the sidewall of a bore hole comprising a high volume hydraulic system having first conduit means for connecting a hydraulic pump to a hydraulic motor used to drive a bit and second conduit means for connecting said hydraulic motor to a reservoir for the hydraulic fluid, wherein, there is a pressure drop when hydraulic fluids flow through said first and second conduit means, a low volume hydraulic system connected to a hydraulic ram means for advancing or retracting said bit, a control valve comprising a housing having a first and second chambers separated by a partition, a piston in said first chamber movable between a first position and a second position, with the second position being closer to said partition, and with said piston being in sealing relationship with the interior surface of said first chamber for the purpose of separating said first chamber into two compartments, a means urging said piston away from said partition, an orifice in said second chamber, a means connected to said piston and extending through said partition in sealing relationship with said partition for adjusting the flow of fluid through said orifice, a bleed port for the communication of fluids between the exterior of said housing and a location in said first chamber between said second position of said piston and said partition, an inlet on one side of said orifice and an outlet on the other side through which low volume hydraulic fluid passes, and an opening to the interior of said first chamber on the side of said piston opposite said partition through which high volume hydraulic system fluid is introduced to apply a pressure to said piston substantially equal to that of the hydraulic fluid in said high volume hydraulic system prior to passage of said hydraulic fluid through said first conduit means, said hydraulic motor, and said second conduit means, wherein the improvement comprises:

a backpressuring means for providing a pressure through said bleed port substantially equal to the pressure drop in said first conduit means and said second conduit means in said high volume hydraulic system.

2. A hydraulic control system as defined in claim 1 wherein said backpressurizing means comprises a capillary section through which a selected volume of hydraulic fluid passes.

3. A hydraulic control system as defined in claim 2, in which said selected volume of fluid flowing through said capillary section is obtained from said low volume hydraulic system.

4. A hydraulic control system for use in a sidewall coring tool to control a hydraulic motor used to drive a bit and a ram means for advancing and retracting the bit from the sidewall of a borehole comprising a high volume hydraulic system connected by a first feed conduit means and a second return conduit means to said hydraulic motor, a low volume hydraulic system connected to said ram means, a control valve for controlling the flow in said low volume hydraulic system to said ram means responsive to the pressure in said high volume hydraulic system, wherein the improvement comprises:

means to adjust said control valve as a function of the pressure drop in said first feed conduit means and said second return conduit means.

5. A hydraulic control system as defined in claim 4, wherein said means to adjust said control valve comprises a capillary section through which a selected volume of hydraulic fluid passes.

6. A hydraulic control system as defined in claim 5, in which said selected volume of fluid flowing through said capillary section is obtained from said low volume hydraulic system.

* * * * *